(No Model.) 2 Sheets—Sheet 2.

C. H. KIMMAL.
PLOW.

No. 598,874. Patented Feb. 8, 1898.

Witnesses
E. H. Monroe
U. B. Hillyard

Inventor
Charles H. Kimmal,
By his Attorneys,
C. A. Snow & Co.

UNITED STATES PATENT OFFICE.

CHARLES H. KIMMAL, OF CONCORDIA, KANSAS.

PLOW.

SPECIFICATION forming part of Letters Patent No. 598,874, dated February 8, 1898.

Application filed March 27, 1897. Serial No. 629,587. (No model.)

*To all whom it may concern:*

Be it known that I, CHARLES H. KIMMAL, a citizen of the United States, residing at Concordia, in the county of Cloud and State of Kansas, have invented a new and useful Plow, of which the following is a specification.

This invention relates to agricultural implements which are designed for breaking the land preparatory to sowing the seed or for cultivating after the plants are up, and has for its object to increase the amount of work performed by a team of given capacity and by a single operator.

The invention relates more particularly to the general construction whereby a series of cultivators are connected in gangs so that each has an independent movement, whereby rows of plants may be followed and obstructions in the line of travel avoided.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
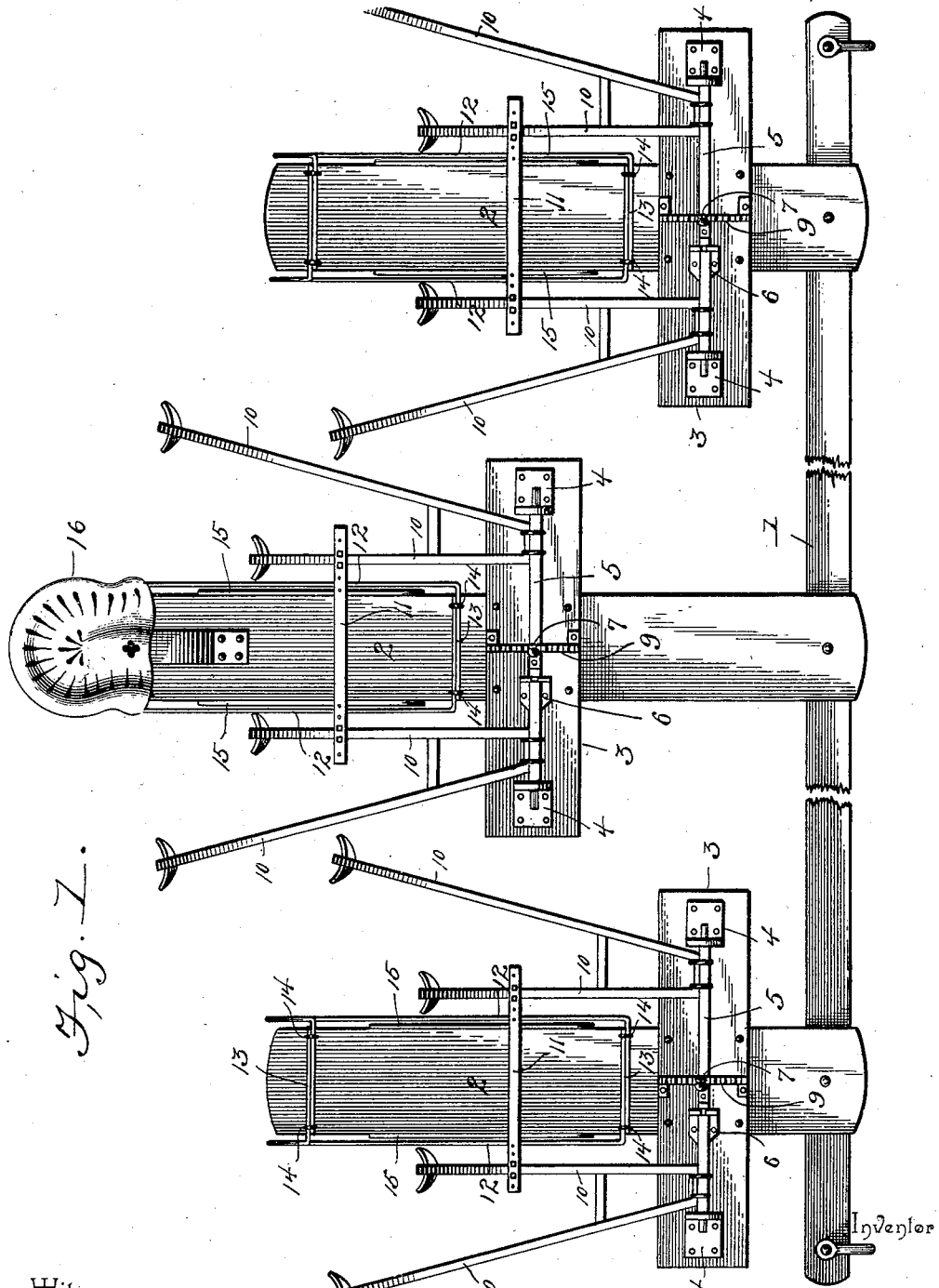
Figure 2:
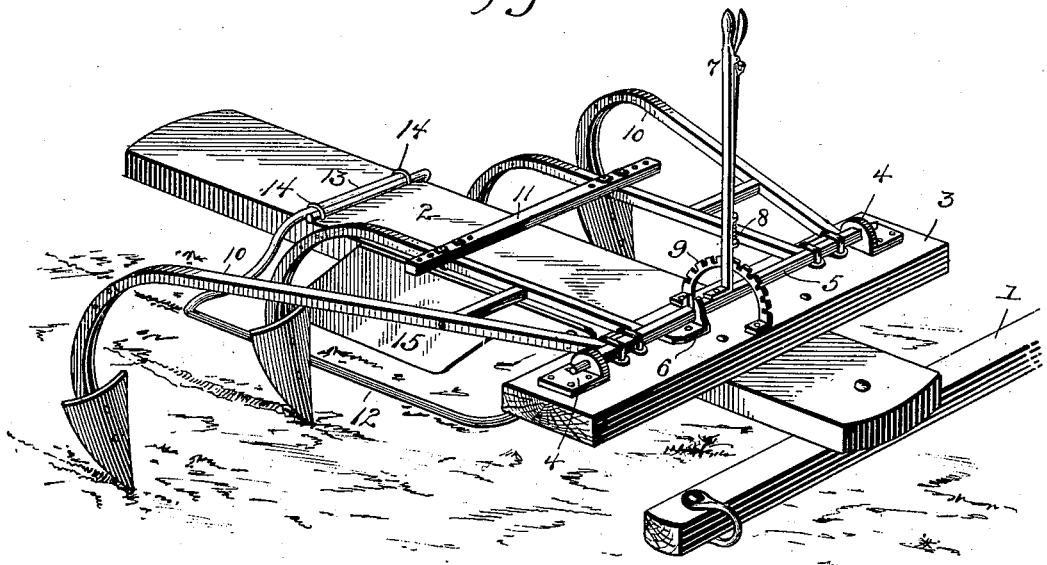
Figure 3:
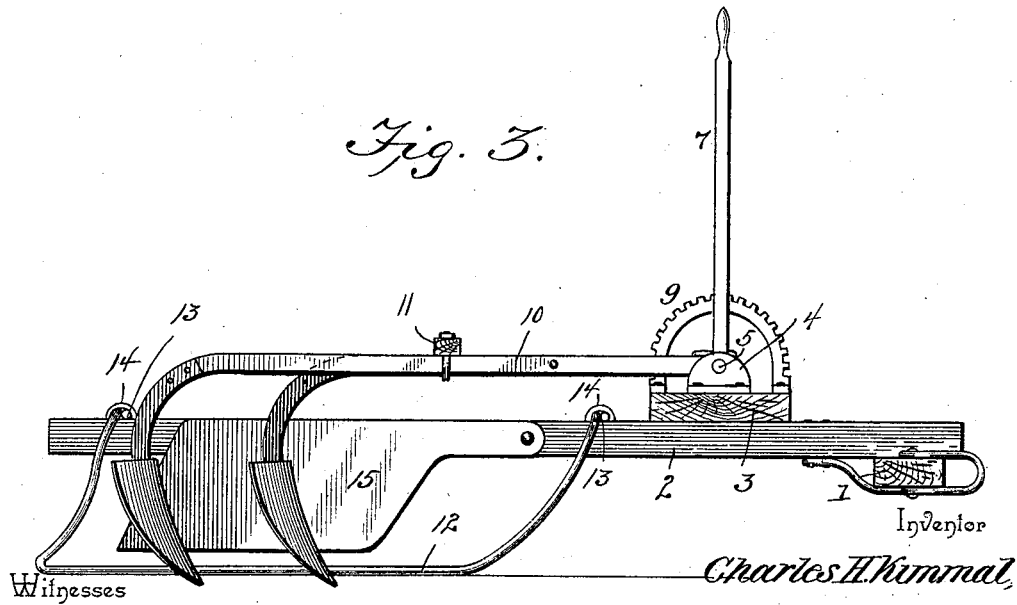

Figure 1 is a top plan view of an agricultural implement constructed in accordance with this invention. Fig. 2 is a perspective view of one of the cultivator-sections. Fig. 3 is a side view thereof.

Corresponding and like parts are referred to in the following description and indicated in the several views of the accompanying drawings by the same reference characters.

The implement comprises a draft-bar 1 and a series of cultivator-sections having loose or pivotal connection therewith, so as to move laterally to follow the irregularities of crooked rows and to avoid obstacles in the path of the implement as the latter is drawn over the field. The cultivator-sections are similarly formed, and a detailed description of one will be sufficient for a clear understanding of each.

The stub or bull tongue 2 may be of suitable construction and has the operating parts connected therewith and in turn has pivotal connection with the draft-bar 1. A cross-bar 3 is bolted or otherwise fastened to the front portion of the tongue and has bearing-brackets 4 near its ends, in which is journaled a shaft or bar 5, to which the cultivator-beams are secured. A bracket 6 is secured to the cross-bar 3 and supports the shaft 5 at an intermediate point. An operating-lever 7 is fastened to the bar or shaft 5 and is provided with a latch 8, of usual form, to engage with a notched segment 9, applied to the part 3 for holding the shaft 5 in an adjusted position. The cultivator-beams 10, being rigidly secured at their front ends to the shaft or bar 5, move with the latter when turned on its journals, whereby the shovels may be raised or lowered to suit the required depth of plowing or cultivation. The beams 10 are provided in pairs and vary in length and are preferably constructed of a single bar, which is doubled upon itself and connected by means of clips or other fastenings to the shaft 5. The shovels, secured to the rear ends of the beams, may be of desired form, according to the nature of the work, and may be plow-points, cutting-blades, teeth, or any of the usual devices commonly secured to standards and plow-beams for tilling and cultivating the soil. A coupling-bar 11 adjustably connects the rear ends of the inner plow or cultivator beams, so as to hold them apart the required distance. This coupling-bar has a series of openings at each end, and clips or like fastenings pass through the said openings and secure the beams in the located position.

The runners 12, by means of which the bull-tongue and the parts attached thereto are supported, are constructed of metal bars of requisite length having their end portions bent to extend about vertically, thence laterally, forming parallel arms 13, the latter extending over the tongue and secured thereto by clips or suitable fastenings 14. The bar iron or metal employed in the formation of the runners is preferably round in cross-section, so as to slide more readily upon the ground and obviate the presentation of corners or angles for catching and accumulating grass and trash. The runners are constructed in rights and lefts, and their horizontal arms 13 pass by each other and are secured together and to the tongue by the same clips or fastenings, as clearly indicated. By loosening the fastenings 14 the runners may be moved farther apart or brought closer together, as required.

In order to prevent injury to the young plants, fenders 15 are secured to the sides of the tongue and are disposed so as to admit of the plants passing between them as the implement is advanced over the ground. The tongue of the middle section is somewhat longer than the tongues of the end sections, whereby the cultivator-shovels of the end sections are located in advance of the cultivator-shovels of the middle section, and whereby the latter may support the seat 16 for the driver. The tongues may be a wooden bar or plate or, if desired, may be constructed of a metal bar bent into the required shape, as may be desired, according to the make and the purpose for which the implement is designed. The pivotal connection between the tongues and the draft-bar is strengthened by a hammer-strap, as clearly indicated in the side elevation.

Having thus described the invention, what is claimed as new is—

1. An agricultural implement comprising a draft-bar, a series of separate sections having independent pivotal connection therewith, each section consisting of a tongue, a cross-bar rigidly connected therewith, a shaft journaled longitudinally of the cross-bar, cultivator-beams secured to the end portions of the shaft, means for turning the shaft and holding it in an adjusted position for regulating the relative height or elevation of the cultivator-shovels, runners applied to the tongue for supporting it, and fenders secured to the tongue for protecting young plants, substantially as set forth.

2. In combination, a bull-tongue, a cross-bar rigidly secured thereto, a shaft journaled in bearings provided on the cross-bar, cultivator-beams rigidly secured to the shaft, an operating-lever having connection with the said shaft, and a latch and notched segment for holding the shaft and cultivator-beams in an adjusted position, substantially as set forth.

3. In combination, a shaft, a pair of cultivator-beams formed of a bar bent upon itself, fastenings for rigidly connecting the bent portion of the bar to the shaft, an operating-lever for turning the shaft in its bearings for raising and lowering the free ends of the cultivator-beams, and a latch and notched segment for holding the operating-lever in an adjusted position, substantially as set forth.

4. In combination, a tongue, cultivating devices applied thereto, runners constructed of bar metal having its end portions bent to extend in an upright position, thence laterally, forming arms, and fastenings for securing adjacent arms together and to the tongue in an adjusted position, substantially as set forth.

5. In combination, a tongue, runners constructed of bar metal having their end portions bent laterally, forming arms, fastenings for adjustably connecting the arms together and to the tongue, a shaft, cultivator-beams secured to the end portions of the shaft upon opposite sides of the tongue, a coupling-bar adjustably connecting the oppositely-disposed cultivator-beams, and means for turning the shaft in its bearings and holding it in an adjusted position, substantially as set forth.

In testimony that I claim the foregoing as my own I have hereto affixed my signature in the presence of two witnesses.

CHARLES H. KIMMAL.

Witnesses:
J. B. KIMMAL,
J. J. MOORE.